United States Patent [19]

Arden

[11] 4,021,583
[45] May 3, 1977

[54] FRUIT-FLAVORED FROZEN CONFECTION AND METHOD OF MAKING THE SAME

[75] Inventor: Sidney Arden, Lawrence, N.Y.

[73] Assignee: Consolidated Foods Corporation, Englewood, N.J.

[22] Filed: Nov. 10, 1975

[21] Appl. No.: 630,232

[52] U.S. Cl. .............................. 426/134; 426/66; 426/91; 426/100; 426/102; 426/327; 426/565; 426/660
[51] Int. Cl.² .......................................... A23G 9/00
[58] Field of Search ............ 426/565, 66, 67, 100, 426/101, 91, 134, 249, 327, 329, 566, 567, 102, 660

[56] References Cited

UNITED STATES PATENTS

| 2,002,963 | 5/1935 | Schade | 426/565 X |
| 2,550,656 | 4/1951 | Knechtges | 426/565 X |
| 2,651,575 | 9/1953 | Talburt | 426/565 X |
| 3,294,544 | 12/1966 | Stanko | 426/565 X |
| 3,335,013 | 8/1967 | Wolfmeyer | 426/565 |
| 3,503,757 | 3/1970 | Rubenstein | 426/565 X |
| 3,525,624 | 8/1970 | Rubenstein | 426/567 |

FOREIGN PATENTS OR APPLICATIONS

| 1,284,729 | 8/1972 | United Kingdom | 426/565 |

OTHER PUBLICATIONS

Ice Cream, 2nd Ed. Arbuckle, Avi. Publish. Co. pp. 30, 31, 40, 41, 44, 45,118–123, 128, 129, 292–305, 1972.

*Primary Examiner*—Steven L. Weinstein
*Attorney, Agent, or Firm*—Seidel, Gonda & Goldhammer

[57] ABSTRACT

A fruit-flavored quiescently frozen confection is produced which is high in total fruit solids content and which has increased resistance to melting and increased protection against stickiness in storage. The high concentration of fruit is obtained by using pureed fruit.

13 Claims, No Drawings

FRUIT-FLAVORED FROZEN CONFECTION AND METHOD OF MAKING THE SAME

BACKGROUND OF THE INVENTION

The present invention relates to quiescently frozen fruit-flavored confections and methods of making the same. More particularly, the present invention is directed to frozen confections with higher total solids content and increased resistance to melting and increased protection against stickiness in storage.

Quiescently frozen stick confections are normally prepared with total solids content in the range of 17–20 weight percent. When the total solids contents are increased beyond the 20% level, problems arise concerning excessive melting at consumption temperatures and wetness in storage at ice cream plant hardening room temperatures of 0° to −30° F. The total solids content can be increased somewhat by the addition of stabilizers such as vegetable gums, i.e., carrageenan, locust bean gums, cellulose gum, guar gum, etc. However, these gums detract from flavoring and are thus usually limited in practice and furthermore by state or local regulation to about 0.50 weight percent maximum. Thus, there is a need to produce fruit-flavored frozen confections high in total solids content without the addition of excessive stabilizers.

SUMMARY OF THE INVENTION

I have found that the addition of pureed fruit, principally apple sauce, but also other fruits such as pureed pears, peaches, oranges, bananas, pineapples, etc., when introduced in the quiescently frozen confection at a concentration from about 10 to 40 weight percent, will bind the water in the confection so that it does not rapidly melt when exposed to temperatures at which the confection is normally consumed. Confections made with the addition of the foregoing percentages of pureed fruits keep well at freezer temperatures for at least six months without deleterious effects.

The present invention provides a quiescently frozen fruit-flavored confection having 21 to 25 weight percent total solids content by including about 10 to 40 weight percent pureed fruit.

DESCRIPTION OF A PREFERRED EMBODIMENT

The quiescently frozen confections of the present invention are produced from a solution comprising from about 10 to 40 weight percent pureed fruit, from about 8 to 20 percent sweetener, from 0 to about 1 weight percent stabilizer, natural or artificial fruit flavor, food acid and food color to suit, and sufficient water to achieve a suitable solids content of 21 to 25 weight percent.

The above composition is made by adding the sweetener, pureed fruit, flavor, acid, color and stabilizer to water under constant agitation. After the solids are completely dissolved, the flavor mix is poured into frozen confection novelty molds and quiescently frozen. The confections may contain a stick which is inserted during freezing. The frozen confections are subsequently removed from the molds after freezing by defrosting or deforming the molds or any other suitable means.

The term "quiescently frozen confection" is defined for the purposes of this disclosure as those confections which are frozen without the incorporation of air, but may be slush frozen or frozen with incorporation of up to 10% maximum overrun so as to properly position a stick in the confection.

The sweetener used in the foregoing solution may be chosen fron cane sugar, corn sugar, honey, corn syrup and varieties thereof.

The food acid may be chosen from any food grade acid product such as citric, tartaric, maleic and fumair acids. The food flavoring may be natural or artificial. Natural flavor may include fruit juice, fruit extracts, etc. Color may be artificial U.S. certified color or natural.

Any conventional stabilizer may be used, for example, carrageenan, locust bean gums, cellulose gum, pectin, guar gum, etc.

The finished quiescently frozen confections may be packed and stored in a freezer at −10° F. to −30° F. and later stored in a retail store's ice cream cabinet at ±5° F. to −10° F. Finished confections can be stored on this basis for periods up to 6 months without undue melting or surface sugar crystalization.

The quiescently frozen confections of the present invention and the method of making the same will be illustrated in more detail with reference to the following specific, non-limiting examples:

EXAMPLE I

A preferred quiescently frozen confection containing pureed fruit was made from a solution comprising the following ingredients:

| Component | Weight Percent |
| --- | --- |
| 58° Brix Orange Juice Concentrate | 13.00 |
| Orange Oil Emulsion | 0.25 |
| Pureed Applesauce | 21.00 |
| Sugar | 10.00 |
| Corn Syrup Solids | 2.00 |
| Guar Gum | 0.20 |
| Water | 53.55 |
| Total: | 100.00 |

Water is added to a vat provided with a high speed agitator. The agitator was started and the sugar, corn syrup solids, pureed fruit, orange juice concentrate, orange flavor and guar gum, were added. The order in which the ingredients are added to the water is not material. The batch was mixed for 30 minutes to completely dissolve the sugar solids. An analysis of a run-off sample indicated a total solids weight percent of 23.5° to 24.5° Brix. The flavored mix was poured into novelty ice cream molds in automatic quiescent freezing stick production equipment such as commercially available from Vitaline or Gram. Confections were quiescently frozen in −30° F. brine and after freezing solid were removed from the molds by defrosting. The finished confections were subsequently wrapped in paper and stored in cardboard cartons.

An examination of the finished confections after six months of storage showed surprising stability and resistance to development of stickiness, wetness or surface sugar crystalization.

Upon exposure to the ambient temperatures at which the confections would normally be consumed, the confections exhibited an increased resistance to melting when compared with confections made using ingredients and processes available in the prior art.

EXAMPLE II

Another preferred quiescently frozen fruit-flavored confection was prepared by the same process as described in Example I using a solution comprising the following ingredients:

| Component | Weight Percent |
|---|---|
| 61° Brix Pineapple Juice Concentrate | 14.00 |
| Pureed Applesauce | 21.00 |
| Sugar | 8.50 |
| Corn Syrup Solids | 2.50 |
| Guar Gum | 0.20 |
| Water | 53.80 |
| Total: | 100.00 |

An analysis of a run-off sample of the solution indicated a total solids weight percent of 23.9° Brix. The frozen confections prepared in accordance with this example also showed increased stability, increased resistance to wetness, and increased resistance to surface sugar crystalization during storage, as well as increased resistance to melting at ambient consumption temperatures.

It will be understood that the term "solution" as used in the foregoing specification and following claims is not limited to true solutions, but covers suspensions, dispersions, and mixtures, since the pureed fruit includes fiber materials which are suspended rather than dissolved.

The present invention may be embodied in other specific forms without departing from the spirit or essential attributes thereof and, accordingly, reference should be made to the appended claims, rather than to the foregoing specification as indicating the scope of the invention.

I claim:

1. A method of making a quiescently frozen confection comprising the steps of mixing together water, pureed fruit and sweetener, to produce a solution in which said pureed fruit constitutes from about 10 to 40 weight percent of said solution, said sweetener constitutes from about 8 to 20 weight percent of said solution, and said water is added in an amount such that said solution has a total solids content of about 21 to 25 weight percent, pouring said solution into molds, and quiescently freezing said solution in said molds with a 0 to 10 percent overrun to produce the finished quiescently frozen confection.

2. A method of making a quiescently frozen confection according to claim 1 wherein said sweetener is selected from the group consisting of cane sugar, corn sugar, honey, corn syrup and mixtures thereof.

3. A method of making a quiescently frozen confection according to claim 1 wherein said solution is further comprised of up to 1 percent of a stabilizer selected from the group consisting of guar gum, locust bean gums, cellulose gum, pectin, and carrageenan.

4. A quiescently frozen confection made according to the method of claim 1.

5. A method of making a quiescently frozen confection according to claim 1 comprising the additional step of inserting a stick into said mold filled with said solution while said solution is freezing.

6. A quiescently frozen confection on a stick made according to the method of claim 2.

7. A method of making a quiescently frozen confection according to claim 1 wherein said pureed fruit is selected from the group consisting of apples, pears, peaches, oranges and bananas.

8. A quiescently frozen confection made according to the method of claim 3.

9. A quiescently frozen confection comprising a quiescently frozen solution containing fruit puree from about 10 to 40 weight percent of said solution, sweetener from about 8 to 20 weight percent of said solution and water in an amount such that said solution has a total solids content of about 21 to 25 weight percent.

10. A method of making a quiescently frozen confection comprising the steps of making a solution comprising about 13 weight percent 58° Brix orange juice concentrate, about 0.25 weight percent orange oil emulsion, about 21 weight percent pureed applesauce, about 10 weight percent sugar, about 2 weight percent corn syrup solids, about 0.2 weight percent guar gum and about 54 weight percent water, pouring said solution into molds, and freezing said solution in said molds with 0 to 10 percent overrun to produce the finished quiescently frozen confection.

11. A quiescently frozen confection made according to the method of claim 10.

12. A method of making a quiescently frozen confection comprising the steps of mixing a solution comprising about 14 weight percent 61° Brix pineapple juice concentrate, about 21 weight percent pureed applesauce, about 8 weight percent sugar, about 2.5 weight percent corn syrup solids, about 0.2 weight percent guar gum, and about 53.8 weight percent water, pouring said solution into molds, and freezing said solution in said mold with 0 to 10 percent overrun to produce the finished quiescently frozen confection.

13. A quiescently frozen confection made according to the method of claim 12.

* * * * *